United States Patent
Tsou et al.

(10) Patent No.: US 7,966,808 B2
(45) Date of Patent: Jun. 28, 2011

(54) BAFFLE SEAL FOR GAS TURBINE ENGINE THRUST REVERSER

(75) Inventors: Chi-Ling Michael Tsou, Renton, WA (US); Carl Francis Holdren, Hamilton, OH (US); William Andrew Bailey, Cincinnati, OH (US); Dean Thomas Lenahan, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1353 days.

(21) Appl. No.: 11/742,233

(22) Filed: Apr. 30, 2007

(65) Prior Publication Data
US 2010/0132331 A1   Jun. 3, 2010

(51) Int. Cl.
*F02K 3/02* (2006.01)

(52) U.S. Cl. ............................ 60/226.2; 244/110.8

(58) Field of Classification Search .............. 60/226.2, 60/230; 239/265.19, 265.33; 244/110 B
See application file for complete search history.

(56) References Cited

U.S. PATENT DOCUMENTS

| | | | |
|---|---|---|---|
| 3,541,794 A | 11/1970 | Johnston et al. | |
| 3,612,209 A | 10/1971 | Vdoviak et al. | |
| 4,026,105 A | 5/1977 | James | |
| 4,030,291 A | 6/1977 | Sargisson | |
| 4,182,501 A * | 1/1980 | Fage ...................... 244/110 B |
| 4,437,627 A | 3/1984 | Moorehead | |
| 4,533,098 A | 8/1985 | Bonini et al. | |
| 4,922,712 A | 5/1990 | Matta et al. | |
| 5,046,307 A | 9/1991 | Matta et al. | |
| 5,224,713 A | 7/1993 | Pope | |
| 5,243,817 A | 9/1993 | Matthias | |
| 5,251,435 A | 10/1993 | Pauley | |
| 5,281,090 A | 1/1994 | Starling | |
| 5,315,821 A | 5/1994 | Dunbar et al. | |
| 5,655,360 A | 8/1997 | Butler | |
| 5,890,873 A | 4/1999 | Willey | |
| 5,915,697 A | 6/1999 | Bagepalli et al. | |
| 5,927,647 A | 7/1999 | Masters et al. | |
| 5,934,613 A | 8/1999 | Standish et al. | |
| 5,974,783 A * | 11/1999 | Gonidec et al. .......... 60/226.2 |
| 6,000,216 A * | 12/1999 | Vauchel .................. 60/226.2 |
| 6,026,638 A | 2/2000 | Gonidec et al. | |
| 6,065,756 A | 5/2000 | Eignor | |
| 6,394,459 B1 | 5/2002 | Florin | |
| 6,592,074 B2 | 7/2003 | Dehu et al. | |
| 6,659,472 B2 | 12/2003 | Aksit et al. | |
| 6,984,106 B2 | 1/2006 | Thompson | |
| 7,338,253 B2 | 3/2008 | Nigmatulin | |
| 7,604,241 B2 | 10/2009 | Kowalczyk | |

* cited by examiner

*Primary Examiner* — Louis Casaregola
(74) *Attorney, Agent, or Firm* — Trego, Hines & Ladenheim, PLLC

(57) ABSTRACT

A baffle seal for a thrust reverser of a gas turbine engine includes a seal body of a resilient material. The seal body has a relatively flat central portion with opposed front and back sides. A raised sealing rim extends at least partially around the central portion. An outer periphery of the sealing rim extends beyond an outer periphery of the central portion so as to define an exposed sealing surface.

12 Claims, 7 Drawing Sheets

BAFFLE SEAL FOR GAS TURBINE ENGINE THRUST REVERSER

BACKGROUND OF THE INVENTION

This invention relates generally to gas turbine engine thrust reversers and more particularly to air seals for such reversers.

A gas turbine engine includes a turbomachinery core having a high pressure compressor, combustor, and high pressure turbine in serial flow relationship. The core is operable in a known manner to generate a primary flow of propulsive gas. A typical turbofan engine adds a low pressure turbine driven by the core exhaust gases which in turn drives a fan through a shaft to generate a bypass flow of propulsive gas. In the case of a high bypass engine this provides the majority of the total engine thrust.

Aircraft turbofan engines typically employ thrust reversers for ground deceleration. Known designs include "target" reversers, blocker-door reversers, and cascade or "doorless" reversers. Thrust reversers may be provided for the primary or bypass flows of an engine, or both. Each type of thrust reverser includes one or move components which are selectively moveable from a stowed position in which they do not affect engine thrust, to a deployed position in which some portion of the engine's thrust is turned or directed forward in order to slow the aircraft.

Thrust reverser components are relatively large and subject to air loads, vibration, thermal gradients, and other varying loads in operation. Accordingly, there is a limit to how small gaps and tolerances can be made, and some leakage of fan bypass flow occurs from the bypass duct to secondary flowpaths (i.e. inside the reverser). This results in a mixing pressure loss in the bypass duct that reduces net thrust, thus undesirably increasing specific fuel consumption (SFC).

BRIEF SUMMARY OF THE INVENTION

These and other shortcomings of the prior art are addressed by the present invention, which provides a thrust reverser seal that reduces unwanted leakage of air flow, thus improving SFC of the engine.

According to one aspect, the invention provides a baffle seal for a thrust reverser of a gas turbine engine, including a seal body of a resilient material. The seal body has a relatively flat central portion having opposed front and back sides; and a raised sealing rim extending at least partially around the central portion. An outer periphery of the sealing rim extends beyond an outer periphery of the central portion so as to define an exposed sealing surface.

According to another aspect of the invention, a transcowl assembly for a gas turbine engine thrust reverser includes (a) longitudinally-extending structural beam having a side face; (b) an arcuate transcowl segment having an end disposed adjacent the side face, the transcowl segment moveable forward and aft along the structure beam between stowed and deployed positions. The transcowl segment includes: (i) an outer panel; (ii) an inner panel; and (iii) an arcuate cross-section baffle disposed between the inner and outer panels. A resilient baffle seal is carried by the structural beam. The baffle seal is arranged to engage in sealing contact with an inner surface of the baffle so as to resist leakage of air between the baffle and the structural beam.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
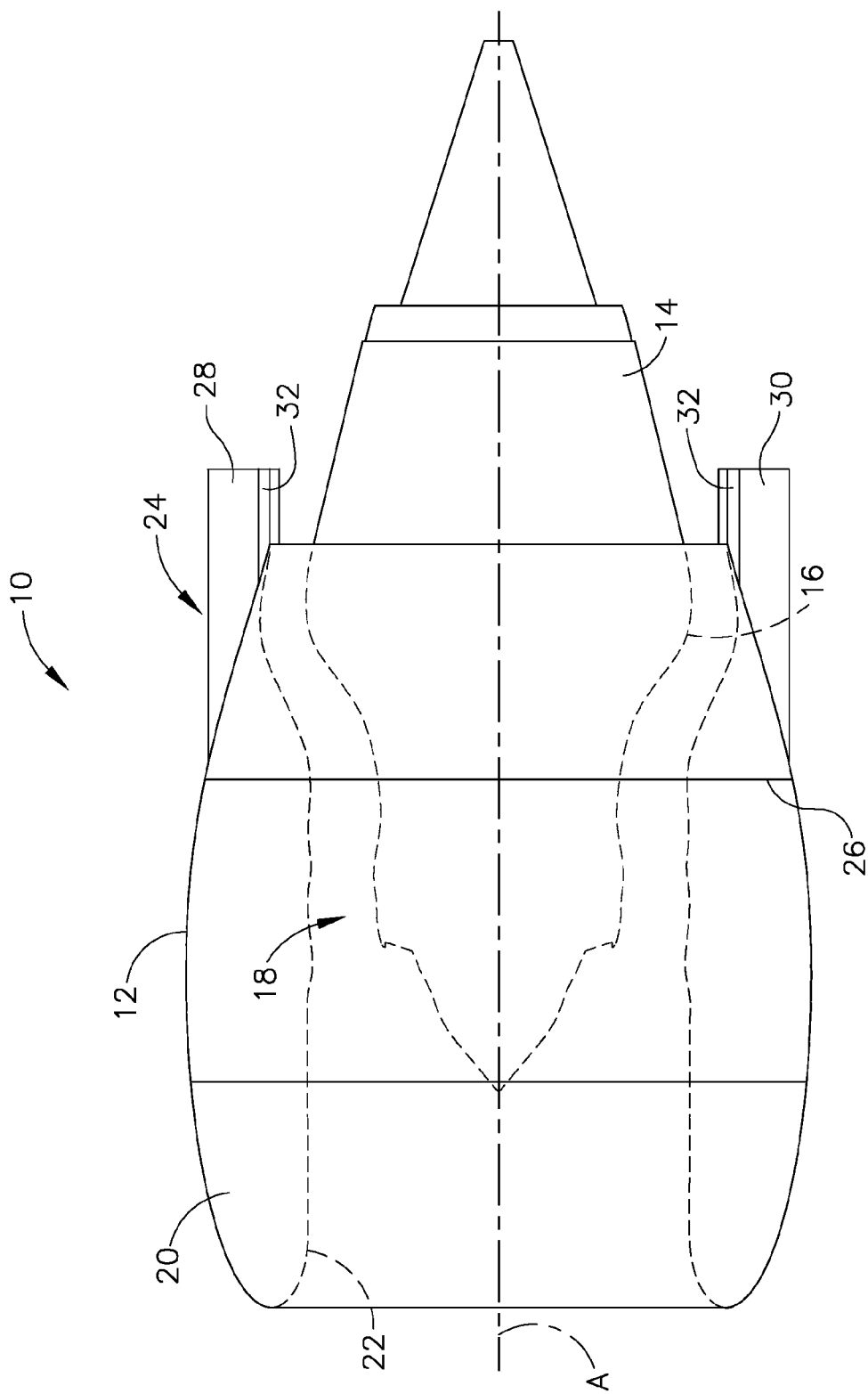
FIG. 1 is a schematic side view of a gas turbine engine incorporating a thrust reverser constructed according to an aspect of the present invention.

Referring to the drawings wherein identical reference numerals denote the same elements throughout the various views, FIG. 1 depicts an aircraft turbofan engine 10. The engine 10 has a longitudinal axis "A". The engine 10 is enclosed in a nacelle 12 and a casing or core nacelle 14 which defines an inner flowpath 16 of a bypass duct 18. A fan nacelle 20 cooperates with the core nacelle 14 to define the outer flowpath 22 of the bypass duct 18.

While not illustrated, it will be understood that the nacelle 12 encloses conventional components including a fan, a low pressure compressor or "booster" and a low pressure turbine ("LPT"), collectively referred to as a "low pressure system", and a high pressure compressor ("HPC"), a combustor, and a high pressure turbine ("HPT"), collectively referred to as a "gas generator" or "core". Together, the high and low pressure systems are operable in a known manner to generate a primary or core flow as well as a fan flow or bypass flow. The present invention is described and illustrated in the context of a high-bypass turbofan engine. However, the principles described herein are equally applicable to fan reversers for low-bypass engines, to turbine reversers, or to turbojet engines.

The engine 10 includes a thrust reverser 24 of the type having a pair of opposed, generally semicircular cowlings referred to as "transcowls" 26. In the illustrated example, the reverser includes "left" and "right" transcowls. Only the left transcowl 26 is shown in FIG. 1, it being understood that the right transcowl 26 is generally a mirror image thereof. The present invention is equally applicable to other configurations which may use transcowls positioned in a different orientation (e.g. upper and lower), or a single larger transcowl. The transcowls 26 are supported at their terminal ends by spaced-apart upper and lower beams 28 and 30, respectively, via rails or tracks 32, so that the transcowls 26 can translate forward and aft in a direction generally parallel to axis A, powered by a known type of actuator (not shown). As with prior art thrust reversers, the reverser halves may be mounted so that they can swing open about a longitudinal axis for inspection or servicing. Accordingly, the upper beam 28 may also be referred to as a "hinge beam" and the lower beam 30 may be referred to as a "latch beam".

Figure 2:
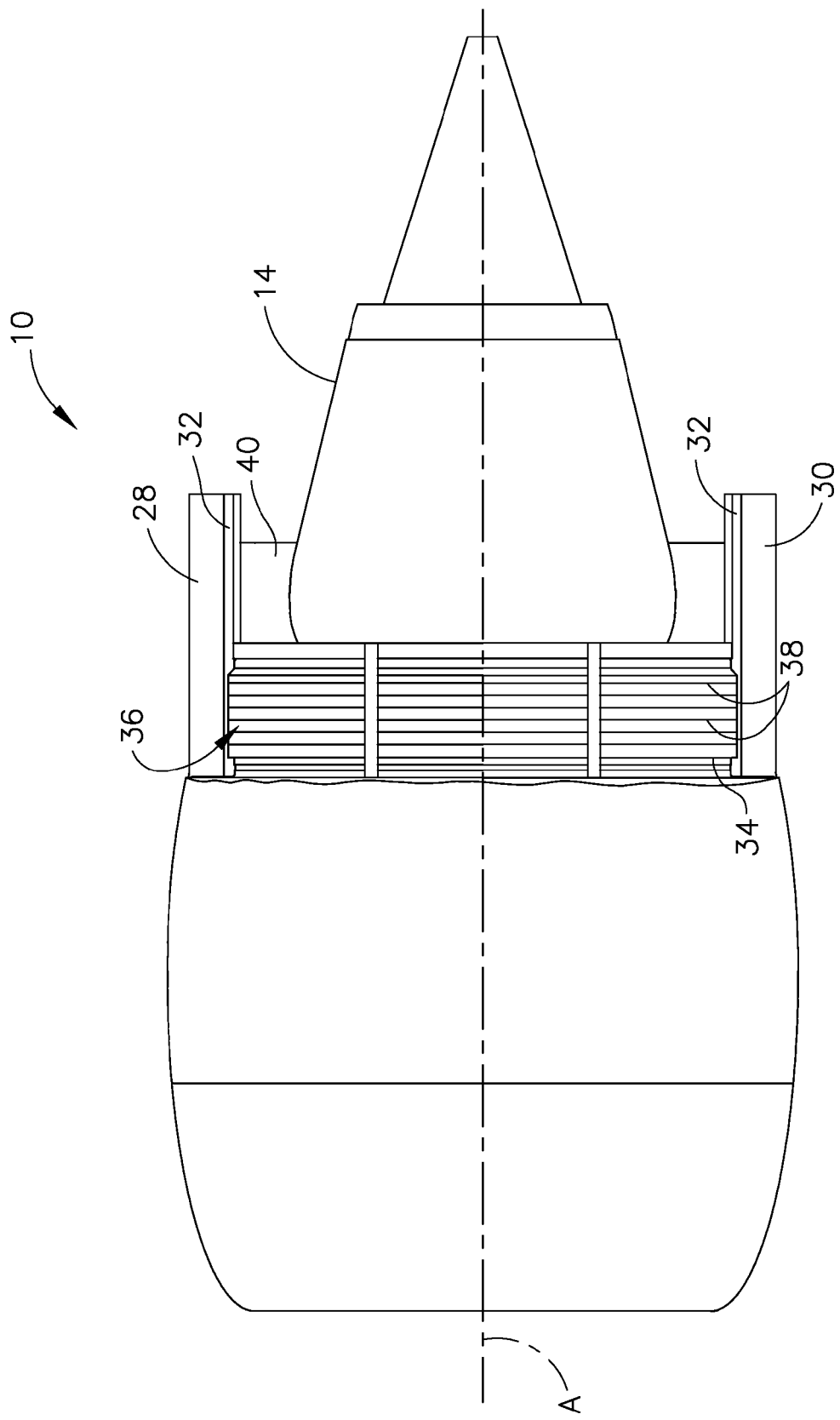
FIG. 2 is schematic side view of the gas turbine engine of FIG. 1, with a transcowl thereof removed to show the internal components of the thrust reverser.

FIG. 2 shows the engine 10 with the transcowl 26 removed to expose the internal components of the thrust reverser 24. A semicircular torque box 34 supports then upper and lower beams 28 and 30. A semicircular assembly of cascade boxes 36 containing reversing vanes 38 extends from the upper beam 28 to the lower beam 30 and is structurally attached to the upper and lower beams 28 and 30 and to the torque box 34. A mirror-image torque box and cascade boxes (not shown) are carried on the opposite side of the engine 10. An inner reverser fairing 40 cooperates with the core nacelle 14 to form a part of the bypass duct inner flowpath 16.

Figure 3:
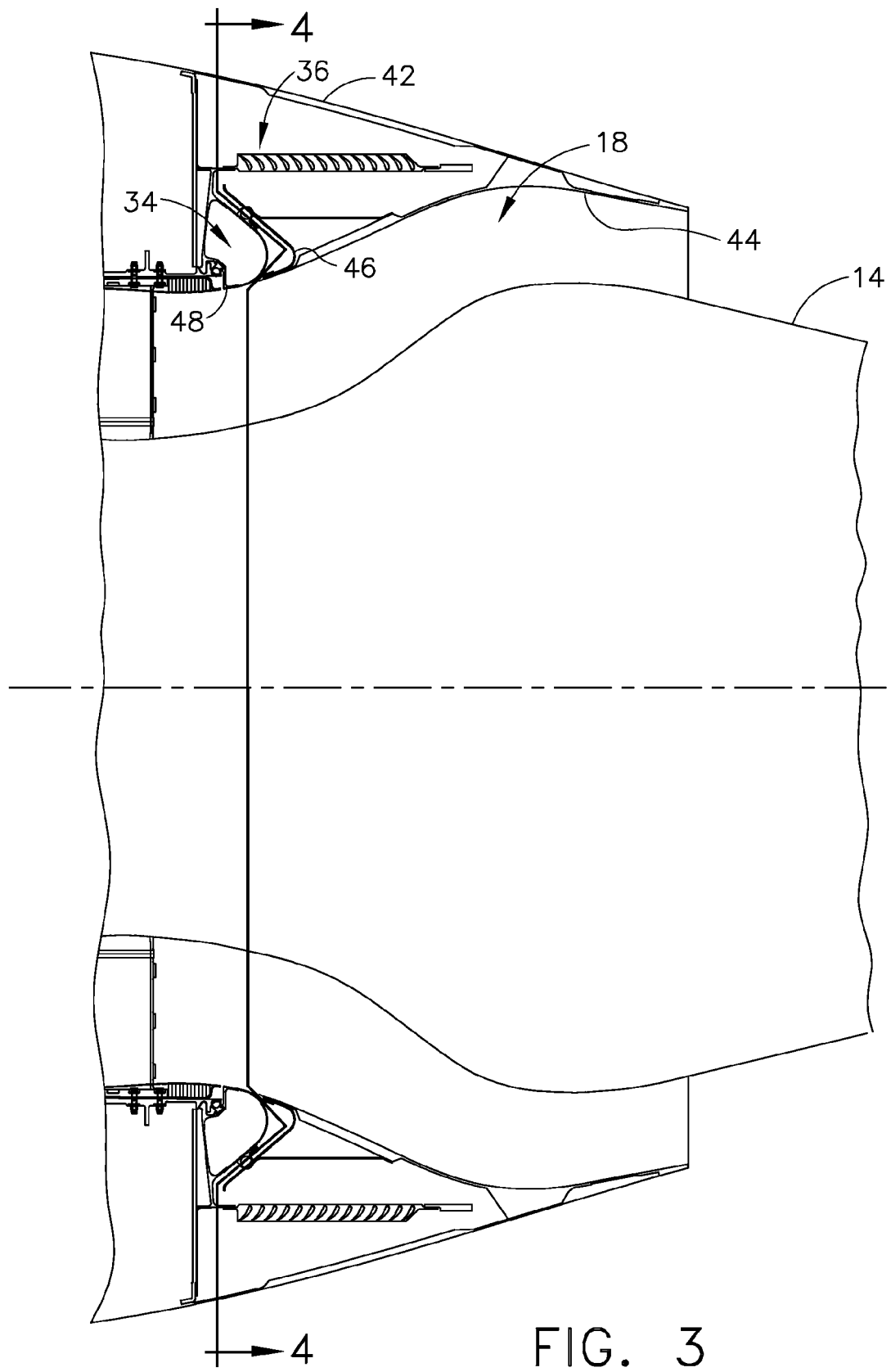
FIG. 3 is a schematic cross-sectional view of an aft portion of the gas turbine engine shown in FIG. 1.

FIG. 3 shows in more detail the cross-section of the thrust reverser 24 in a forward-most or "stowed" position. The transcowl 26 includes an outer wall 42, an inner wall 44 which forms a part of the outer flowpath 22, and a forward-facing baffle 46 having an arcuate cross-section. A radially inner end of the baffle 46 carries a forward seal 48 which rides in close proximity to the aft end of the torque box 34.

For various reasons it is impractical to make a complete seal between the torque box 34 and the baffle 46 using the forward seal 48. Accordingly, there exists an open leakage path which allows air to flow from the bypass duct 18 through the forward seal 48 in a generally radially outward direction into the space between the torque box 34 and the baffle 46, then circumferentially around to the upper beam 28 and the lower beam 30, and then longitudinally aft back into the bypass duct 18. Diversion of the fan flow through this leakage path results in a mixing pressure loss which reduces net thrust of the engine 10, which in turn increases SFC.

Figure 4:
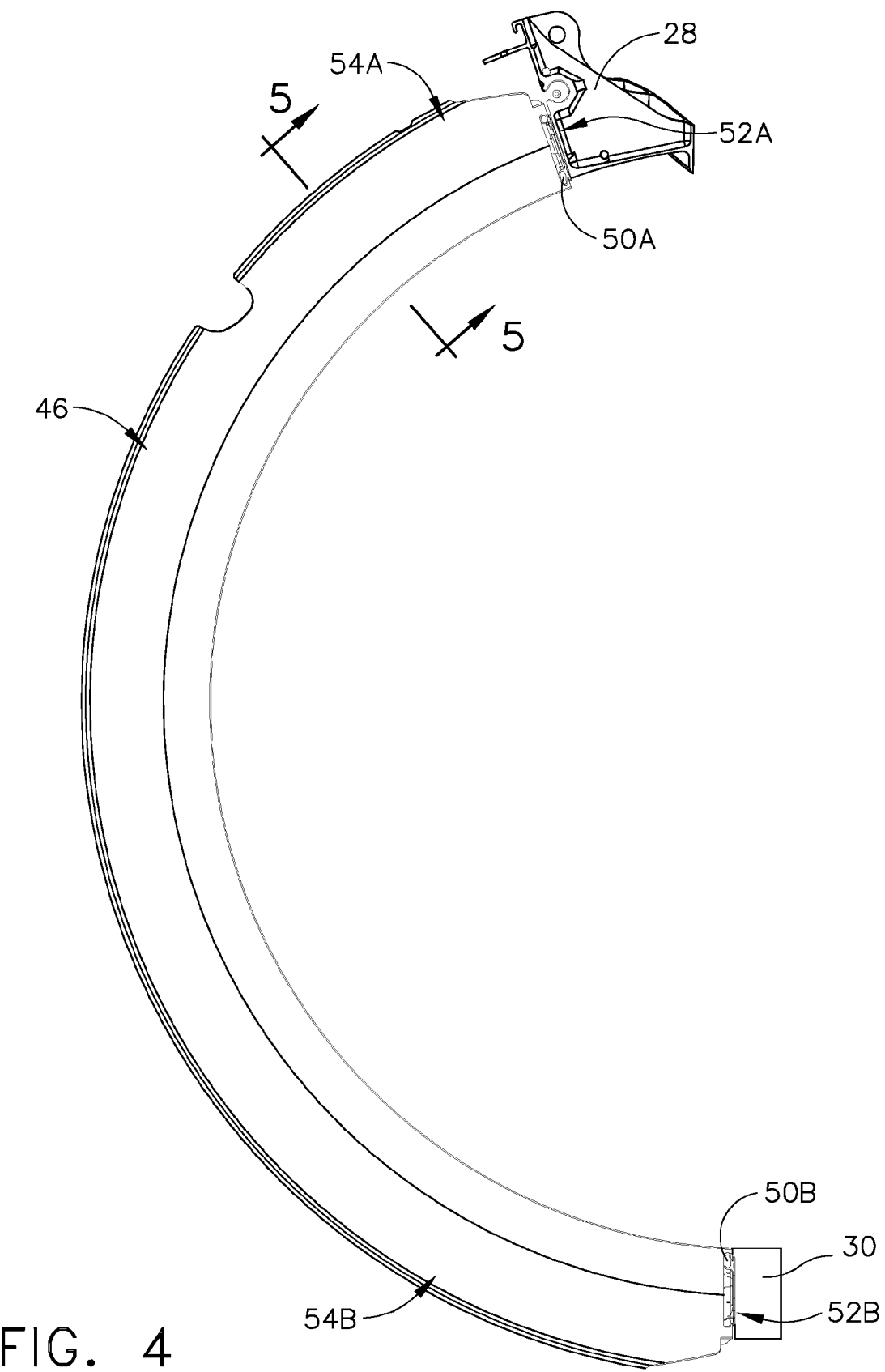
FIG. 4 is half-sectional view taken along lines 4-4 of FIG. 3.

To reduce or prevent this leakage, one or more baffle seals 50 are provided, as shown in FIG. 4, which is a forward-looking aft (FLA) view. Upper and lower baffle seals 50A and 50B are attached to the side faces 52A and 52B of the upper and lower beams 28 and 30, respectively, in alignment with the upper and lower ends 54A and 54B of the baffle 46. Only the right-side (i.e. aircraft starboard side) baffle seals 50 are shown in FIG. 4, with the understanding that another pair of baffle seals 50 would be installed on the left-side (i.e. aircraft port) faces of the upper and lower beams 28 and 30.

Figure 5:
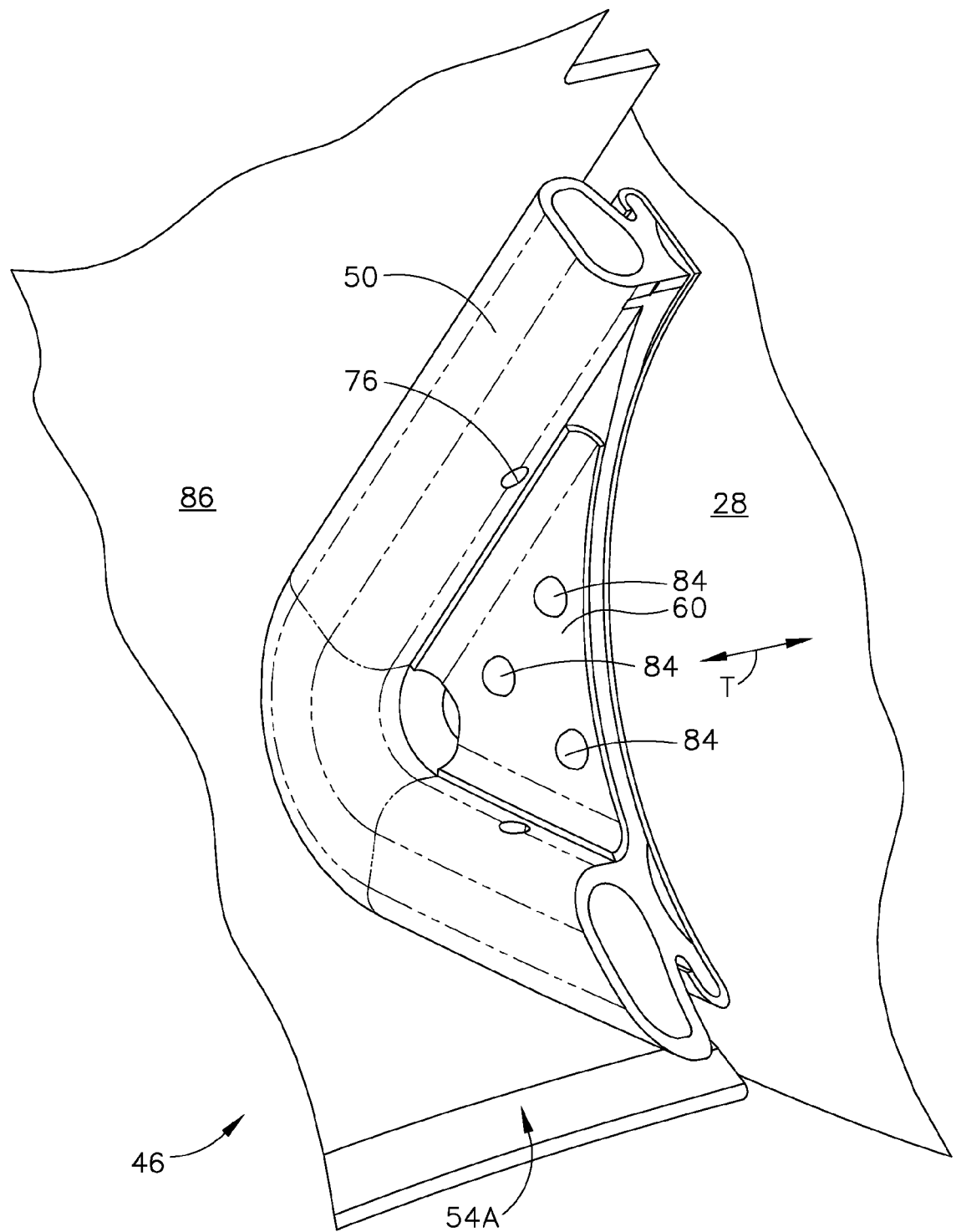
FIG. 5 is a perspective view of a baffle seal of the thrust reverser.
Figure 6:
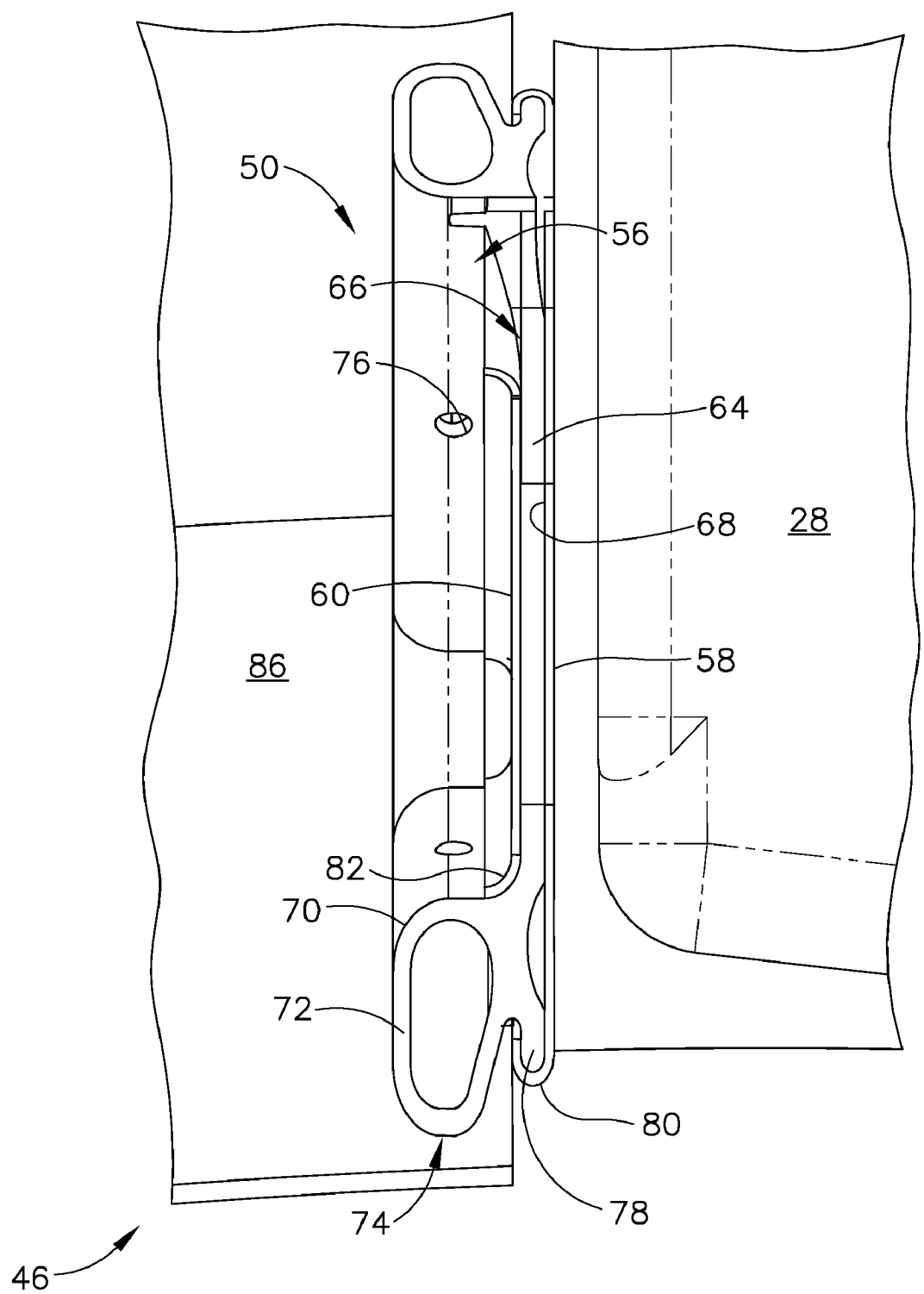
FIG. 6 is a front view of the baffle seal of FIG. 5.
Figure 7:
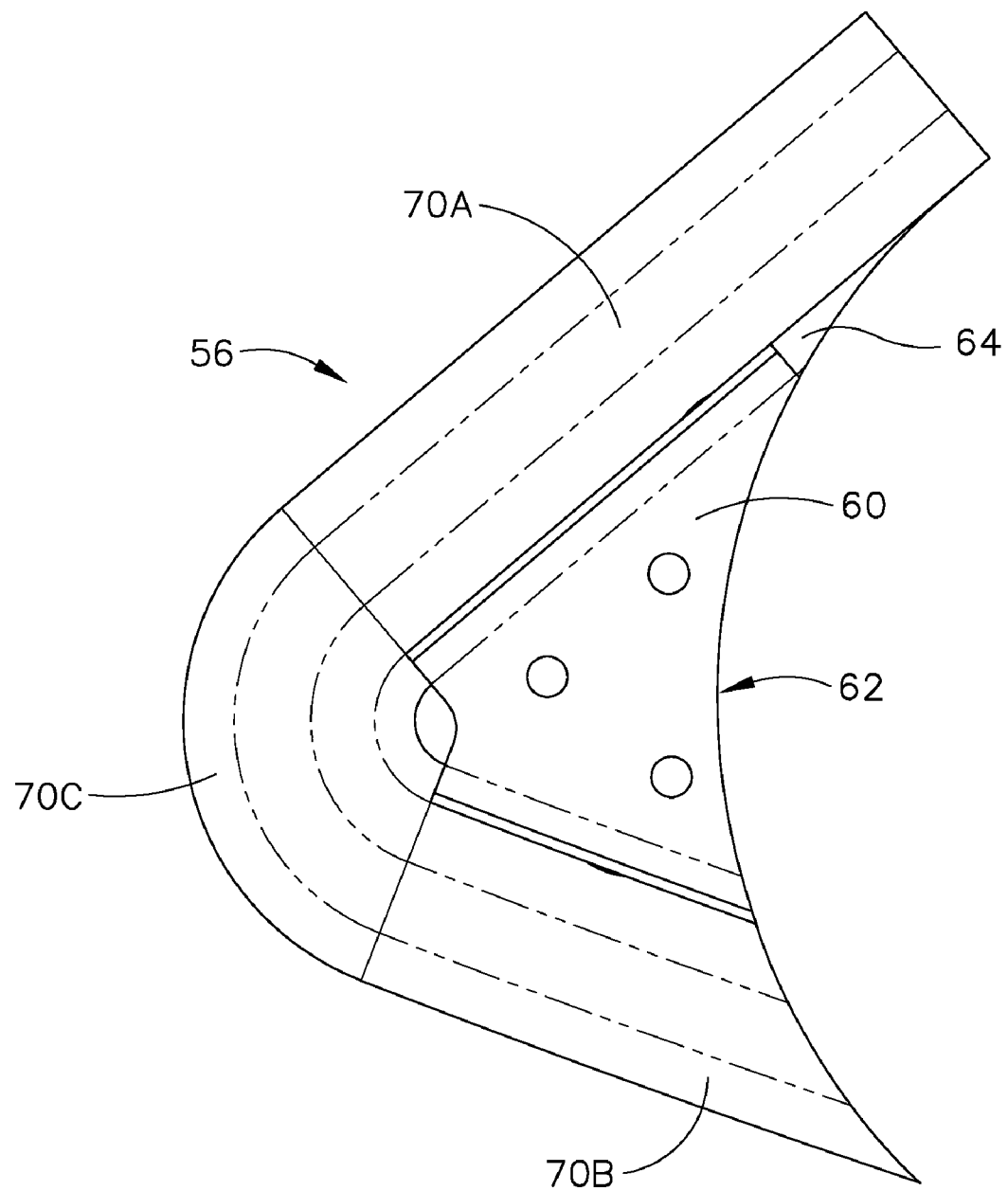
FIG. 7 is a side view of the baffle seal of FIG. 5.

FIGS. 5-7 illustrate a baffle seal 50 in more detail. The specific baffle seal 50 illustrated is the upper right-hand unit, which is identical to a lower left-hand unit (not shown). In this example, the upper left-hand and lower right-hand baffle seals 50 would have mirror-image configurations to that of the illustrated baffle seal 50, but otherwise the baffle seal 50 is representative of all of the baffle seals 50.

Each baffle seal 50 comprises a seal body 56, optionally provided with a backing plate 58 and a retainer 60. The seal body 56 is generally three-sided in plan view with an arcuate forward edge 62 contoured to the shape of the torque box 34. The seal body 56 may be generally triangular or may be more of a "D"-shape in plan view, depending on the particular application. The seal body 56 has a relatively flat central portion 64 with opposed front and back sides 66 and 68. The upper and lower edges of the seal body 56 are formed into a hollow tube-like sealing rim 70 formed by a closed wall 72, which in this case has an elongated cross-section with rounded ends. Other cross-sectional shapes may be used as well. For example, instead of a tube-like geometry, the sealing rim 70 ma be a flange or "flapper" shape. The outer periphery of the sealing rim 70 defines a sealing surface 74 which extends beyond the outer periphery of the central portion. The sealing rim 70 is generally V- or C-shaped with elongated legs 70A and 70B connected at their proximal ends by a curved segment 70C. When installed, the distal ends of the legs 70A and 70B butt up against other components of the thrust reverser 24 and may be closed off with a sealant, such as room-temperature vulcanizing (RTV) silicone. At least one vent opening 76 is formed in the sealing rim 70 to allow it to equalize its internal pressure with the ambient pressure (e.g. when atmospheric pressure changes during flight, or when the sealing rim 70 is compressed during stowage of the transcowl 26). A portion of the periphery of the seal body 56 extends outwardly from the central portion 64 to form an edge bead 78.

The seal body 56 is formed from a resilient material such as silicone rubber. The outer surface of the baffle seal 50 may be covered with a flexible, abrasion-resistant material to avoid damage from rubbing. One example of a suitable material is DACRON polyester fabric.

The backing plate 58 is made of a relatively rigid material such as aluminum sheet. It is generally triangular in plan view with an arcuate forward edge and has a curved lip 80 formed around its periphery (or a portion thereof) which serves to receive the edge bead 78 of the baffle seal 50.

The retainer 60 is also made of a relatively rigid material such as aluminum sheet. It is generally triangular in plan view with an arcuate forward edge. It has flanges 82 formed along its upper and lower edges which bear against the inside surfaces of the baffle seal 50, near the junction between the central portion 64 and the sealing rim 70.

In the illustrated example the baffle seal 50 is secured to the upper beam 28 with rivets 84 extending through the retainer 60, baffle seal 50, backing plate 58, and the upper beam 28. However it will be understood that the baffle seal 50 could be attached with other types of fasteners (e.g. bolts, machine screws), or by methods such as welding or adhesives. The backing plate 58 restrains the outer periphery of the seal body 56 against the upper beam 28 so as to avoid "dishing" or curling. The seal body 56 is further restrained in the desired shape by the retainer, which presses the sealing surface 74 into place as well as spreading out the load of the metallic rivets 84 to hold the seal body 56 in place without tearing.

When the transcowl 26 is stowed, as shown in FIGS. 5 and 6, the interior surface 86 of the baffle 46 engages the baffle seal 50. Because the transcowl 26 moves in the direction of the arrow "T" when being stowed or deployed, the interaction with the baffle seal 50 is a combination of sliding and compression. This minimizes any loads placed on the actuating equipment by the presence of the baffle seal 50.

In operation, flow in the bypass duct 18 will initially tend to leak past the forward seal 48 as with a prior art thrust reverser and will flow circumferentially inside the leak path. However, the air is blocked or substantially prevented from exiting the leak path by the baffle seal 50. This tends to cause the pressure to equalize between the leak path and the bypass duct 18. Without a substantial pressure differential to drive flow into the leak path, further leakage is greatly reduced. It is estimated that this leakage reduction can improve SFC by about 0.05% in certain applications.

The foregoing has described a baffle seal for a gas turbine engine thrust reverser. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A transcowl assembly for a gas turbine engine thrust reverser, comprising:
   (a) a first longitudinally-extending structural beam having a first side face;
   (b) an arcuate transcowl segment having a first end disposed adjacent the first side face, the transcowl segment moveable forward and aft along the structure beam between stowed and deployed positions, and including:
      (i) an outer panel;
      (ii) an inner panel; and (iii) an arcuate cross-section baffle disposed between the inner and outer panels; and (d) a resilient first baffle seal carried by the structural beam, the first baffle seal arranged to engage in sealing contact with an interior surface of the baffle so as to resist leakage of air between the baffle and the first structural beam.

2. The transcowl assembly of claim 1 further including (a) a second longitudinally-extending structural beam having a second side face, wherein a second end of the transcowl segment is disposed adjacent the second side face; and (b) a resilient second baffle seal carried by the structural beam, the second baffle seal arranged to engage in sealing contact with the interior surface of the baffle so as to resist leakage of air between the baffle and the second structural beam.

3. The transcowl assembly of claim 1 wherein the first baffle seal includes:

a seal body of a resilient material, comprising:

a relatively flat central portion having opposed front and back sides; and a raised sealing rim extending at least partially around the central portion, an outer periphery of the sealing rim extending beyond an outer periphery of the central portion so as to define an exposed sealing surface.

4. The transcowl assembly of claim 3 wherein the sealing rim includes a pair of divergent legs extending connected at their proximal ends by a curved segment.

5. The transcowl assembly of claim 3 wherein the sealing rim is hollow tube-like structure defined by a closed wall.

6. The transcowl assembly of claim 5 wherein at least one vent opening extends through the wall of the sealing rim.

7. The transcowl assembly of claim 5 wherein the wall of the sealing rim has an elongated cross-section with curved ends.

8. The transcowl assembly of claim 3 wherein an abrasion-resistant cover is disposed over at least the sealing surface.

9. The transcowl assembly of claim 3 wherein the seal body comprises silicone rubber.

10. The transcowl assembly of claim 3 in which an edge bead extends outwardly from the central portion of the seal body.

11. The transcowl assembly of claim 10 further comprising a relatively rigid backing plate disposed between the back side of the seal body and the first side face, and including a curved lip which engages the edge bead.

12. The transcowl assembly of claim 3 further comprising a relatively rigid retainer disposed against the front side of the central portion and clamping the first baffle seal against the first side face, the retainer including at least one raised flange which bears against the sealing rim.

* * * * *